United States Patent
Lau (12) United States Patent (10) Patent No.: US 7,536,482 B1
Lau (45) Date of Patent: May 19, 2009

(54) METHODS AND DEVICES FOR ENABLING A MOBILE NETWORK DEVICE TO SELECT A FOREIGN AGENT

(75) Inventor: Samuel Lau, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1233 days.

(21) Appl. No.: 10/358,784

(22) Filed: Feb. 4, 2003

(51) Int. Cl.
*G06F 15/16* (2006.01)
(52) U.S. Cl. ...................................... 709/249
(58) Field of Classification Search ................ 709/249; 370/310, 351
See application file for complete search history.

(56) References Cited

U.S. PATENT DOCUMENTS

| | | | |
|---|---|---|---|
| 6,487,605 B1 | 11/2002 | Leung | 709/245 |
| 6,510,144 B1 | 1/2003 | Dommety et al. | 370/328 |
| 6,636,498 B1 | 10/2003 | Leung et al. | 370/338 |
| 6,975,614 B2 * | 12/2005 | Kennedy | 370/338 |
| 7,139,262 B1 * | 11/2006 | Elliott | 370/351 |

* cited by examiner

*Primary Examiner*—Jeffrey Pwu
*Assistant Examiner*—Farhad Ali
(74) *Attorney, Agent, or Firm*—Weaver Austin Villeneuve & Sampson LLP (57) ABSTRACT

Method and devices are provided for enabling a mobile network device to select a foreign agent from among a plurality of foreign agents that are transmitting position information. According to some aspects of the invention, the position information includes global positioning system ("GPS") data that are included in advertisement packets transmitted by the foreign agents. A mobile network device such as a mobile router may use the position information to select the closest foreign agent. Alternatively, the mobile network device may use the position information to select the foreign agent that is approaching most rapidly, based on the reference frame of the mobile network device.

22 Claims, 7 Drawing Sheets

METHODS AND DEVICES FOR ENABLING A MOBILE NETWORK DEVICE TO SELECT A FOREIGN AGENT

BACKGROUND OF THE INVENTION

1. Field of the Invention

The present invention relates to Mobile IP network technology. More particularly, the present invention relates to enabling a mobile network device to select a foreign agent.

2. Description of the Related Art

Mobile IP is a protocol that allows laptop computers or other mobile computer units (referred to as "Mobile Nodes" herein) to roam between various sub-networks at various locations—while maintaining Internet and/or WAN connectivity. Without Mobile IP or related protocol, a Mobile Node would be unable to stay connected while roaming through various sub-networks. This is because the IP address required for any node to communicate over the Internet is location specific.

Each IP address has a field that specifies the particular sub-network on which the node resides. If a user desires to take a computer that is normally attached to one node and roam with it so that it passes through different sub-networks, it cannot use its home base IP address. As a result, a business person traveling across the country cannot merely roam with his or her computer across geographically disparate network segments or wireless nodes while remaining connected over the Internet. This is not an acceptable state of affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

Figure 1:
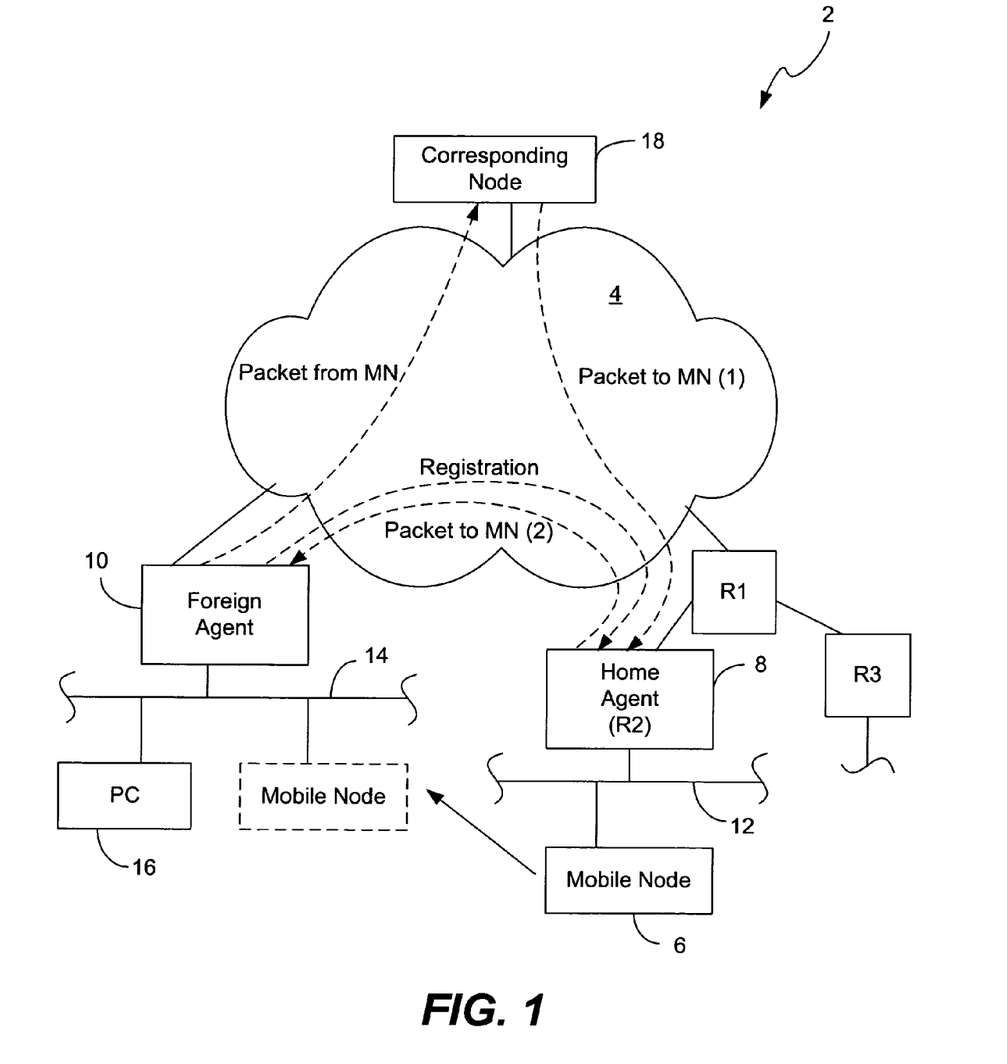
FIG. 1 is a diagram illustrating a Mobile IP network segment and associated environment.

The Mobile IP process and environment are illustrated in FIG. 1. As used herein, a "mobile network device" will mean any mobile computing or telecommunication device that can communicate over the Internet (or a similar network), including but not limited to a mobile network device such as a router, a mobile personal computer, a mobile telephone, a mobile personal digital assistant and other mobile nodes. Some such devices may need to be used in connection with, e.g., a mobile access router running mobile IP. The descriptions herein regarding the movement of mobile nodes from home agent to foreign agents, etc., shall apply generally to the movement of mobile network devices unless otherwise specified.

As shown in FIG. 1, a Mobile IP environment 2 includes the Internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer, a mobile router, etc.) plugged into its home network segment connects with the Internet through its designated Home Agent. When the Mobile Node roams, it communicates via the Internet through an available Foreign Agent. Presumably, there are many Foreign Agents available at geographically disparate locations to allow widespread Internet connection via the Mobile IP protocol. Note that it is also possible for the Mobile Node to register directly with its Home Agent.

As shown in FIG. 1, Mobile Node 6 normally resides on (or is "based at") a network segment 12 that allows its network entities to communicate over the Internet 4 through Home Agent 8 (an appropriately configured router denoted R2). Note that Home Agent 8 need not directly connect to the Internet. For example, as shown in FIG. 1, it may be connected through another network device (a router R1 in this case). Router R1 may, in turn, connect one or more other routers (e.g., a router R3) with the Internet.

Mobile Node 6 may be removed from its home base network segment 12 and may roam to a remote network segment 14. Network segment 14 may include various other nodes such as a PC 16. The nodes on network segment 14 communicate with the Internet through a router which doubles as Foreign Agent 10. Mobile Node 6 may identify Foreign Agent 10 through various transmissions made by Foreign Agent 10, including solicitations and advertisements, which form part of the Mobile IP protocol.

When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 typically updates an internal "mobility binding table" which specifies the care of address (e.g., a collocated care of address or the Foreign Agent's IP address) in association with the identity of Mobile Node 6. Further, the Foreign Agent 10 normally updates an internal "visitor table" which specifies the Mobile Node address, Home Agent address, etc. In effect, the Mobile Node's home base IP address (associated with segment 12) has been shifted to the Foreign Agent's IP address (associated with segment 14).

If Mobile Node 6 wishes to send a message to a corresponding node 18 from its new location, an output message from the Mobile Node is then packetized and forwarded through Foreign Agent 10 over the Internet 4 and to corresponding node 18 (as indicated by the dotted line "packet from MN") according to a standard Internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the Internet 4 and to router R1 and ultimately to Home Agent 8, as indicated by the dotted line ("packet to MN(1)").

From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

In addition to providing connectivity to a mobile node, it may be desirable to provide for the mobility of one or more networks moving together, such as on an airplane or a ship. RFC 2002 section 4.5 discusses the possibility of implementing mobile routers.

If Mobile Node 6 (or a mobile router) continues to move, it will receive advertisements from other foreign agents. In general, if Mobile Node 6 receives an advertisement from a new foreign agent, Mobile Node 6 will "tear down" its tunnel connection with Foreign Agent 10 and establish a new connection with the new foreign agent.

However, the new foreign agent may not be the optimal foreign agent with which to establish a connection. For example, Mobile Node 6 may only receive advertisements from the new foreign agent for a brief period of time, as Mobile Node 6 travels in and out of the range of advertisements from the new foreign agent. This situation may be further complicated if Mobile Node 6 travels in and out of the range of advertisements from multiple foreign agents, or simply remains within overlapping ranges of multiple foreign agents. Under such circumstances, Mobile Node 6 would continue to tear down the established tunnel and create a new tunnel to the foreign agent from which Mobile Node 6 most recently received an advertisement. The process of tearing down and re-establishing a tunnel may take several seconds. Conventional mobile nodes and mobile routers do not have the ability to determine the optimal foreign agent with which to establish and maintain a connection under such circumstances.

SUMMARY OF THE INVENTION

Method and devices are provided for enabling a mobile network device (such as a mobile router) to select a foreign agent from among a plurality of foreign agents that are transmitting position information. According to some aspects of the invention, the position information includes global positioning system ("GPS") data that are included in advertisement packets transmitted by the foreign agents. A mobile network device may use the position information to select the closest foreign agent. Alternatively, the mobile network device may use the position information to select the foreign agent that the mobile network device appears to be approaching most rapidly.

Although some embodiments will be described herein with reference to only two foreign agents, it will be appreciated by those of skill in the art that the methods and devices described herein apply to situations wherein any number of foreign agents are transmitting position information.

In accordance with some aspects of the invention, a method of selecting a foreign agent is provided. The method includes the following steps: receiving a first coordinate signal indicating a first foreign agent position; receiving a second coordinate signal indicating a second foreign agent position; determining a mobile network device position of a mobile network device; calculating a first distance between the mobile network device position and the first foreign agent position; calculating a second distance between the mobile network device position and the second foreign agent position; comparing the first distance and the second distance to determine whether the mobile network device is closer to the first foreign agent or to the second foreign agent; and selecting either the first foreign agent or the second foreign agent according to the determination of the comparing step.

The method may include the step of sending a registration request to a Home Agent via the selected foreign agent. The mobile network device may be a mobile router. The first coordinate signal may be part of a first agent advertisement packet transmitted by the first foreign agent. The second coordinate signal may be part of a second agent advertisement packet transmitted by the second foreign agent. The first coordinate signal may include data from the global positioning system ("GPS"). The second coordinate signal may also include data from the GPS.

According to other aspects of the invention, an alternative method of selecting a foreign agent is provided. This method includes the following steps: receiving a first coordinate signal indicating a first foreign agent position; receiving a second coordinate signal indicating a second foreign agent position; determining a first mobile network device position of a mobile network device at a first time; determining a second mobile network device position of the mobile network device at a second time; calculating a first relative velocity between the mobile network device and a first foreign agent; calculating a second relative velocity between the mobile network device and a second foreign agent position; comparing the first relative velocity and the second relative velocity to determine whether the mobile network device is approaching the first foreign agent or the second foreign agent more rapidly; and selecting either the first foreign agent or the second foreign agent according to the determining step.

The mobile network device may be a mobile router. The method may include the step of determining whether the mobile network device is closer to the first foreign agent or to the second foreign agent. The calculating, comparing and selecting steps may be performed by the mobile network device. The first coordinate signal may be part of a first agent advertisement packet transmitted by the first foreign agent. The second coordinate signal may be part of a second agent advertisement packet transmitted by the second foreign agent. The first coordinate signal and the second coordinate signal may include GPS data.

Some embodiments of the invention provide a mobile network device that includes the following components: a receiver for receiving a first coordinate signal indicating a first position of a first foreign agent and for receiving a second coordinate signal indicating a second position of a second foreign agent; and a processor for: calculating a first distance between a mobile network device position of the mobile network device and the first position; calculating a second distance between the mobile network device position and the second position; determining whether the mobile network device is closer to the first foreign agent or to the second foreign agent; and selecting either the first foreign agent or the second foreign agent according to the determining step. The mobile network device may be a mobile router.

Other embodiments of the invention provide a mobile network device configured to perform the following steps: receiving a first coordinate signal indicating a first position of a first foreign agent; receiving a second coordinate signal indicating a second position of a second foreign agent; calculating a first distance between a mobile network device position of the mobile network device and the first position; calculating a second distance between the mobile network device position and the second position; determining whether the mobile network device is closer to the first foreign agent or to the second foreign agent; and selecting either the first foreign agent or the second foreign agent according to the determining step.

The first coordinate signal may be part of a first agent advertisement packet transmitted by the first foreign agent. Similarly, the second coordinate signal may be part of a second agent advertisement packet transmitted by the second foreign agent. The first coordinate signal and the second coordinate signal may include GPS data.

Alternative embodiment of the invention provide a mobile network device that includes components configured to perform the following steps: receiving a first coordinate signal indicating a first position of a first foreign agent; receiving a second coordinate signal indicating a second position of a second foreign agent; calculating a first distance between a mobile network device position of the mobile network device and the first position; calculating a second distance between the mobile network device position and the second position; determining whether the mobile network device is closer to the first foreign agent or to the second foreign agent; and selecting either the first foreign agent or the second foreign agent according to the determining step.

Still other embodiments of the invention provide a mobile network device that includes components configured to perform the following steps: receiving a first coordinate signal indicating a first foreign agent position; receiving a second coordinate signal indicating a second foreign agent position; determining a first mobile network device position of the mobile network device at a first time; determining a second mobile network device position of the mobile network device at a second time; calculating a first relative velocity between the mobile network device and a first foreign agent; calculating a second relative velocity between the mobile network device and a second foreign agent; comparing the first relative velocity and the second relative velocity to determine whether the mobile network device is approaching the first foreign agent or the second foreign agent more rapidly; and selecting either the first foreign agent or the second foreign agent according to the determining step.

The mobile network device may also include a component configured for determining whether the mobile network device is closer to the first foreign agent or to the second foreign agent. The mobile network device may be a mobile router.

Yet other embodiments of the invention provide a computer program embodied in a machine-readable medium, the computer program controlling a mobile network device to perform the following steps: receiving a first coordinate signal indicating a first position of a first foreign agent; receiving a second coordinate signal indicating a second position of a second foreign agent; calculating a first distance between a mobile network device position of the mobile network device and the first position; calculating a second distance between the mobile network device position and the second position; determining whether the mobile network device is closer to the first foreign agent or to the second foreign agent; and selecting either the first foreign agent or the second foreign agent according to the determining step.

Still further embodiments of the invention provide a computer program embodied in a machine-readable medium, the computer program controlling a mobile network device to perform the following steps: receiving a first coordinate signal indicating a first foreign agent position; receiving a second coordinate signal indicating a second foreign agent position; determining a first mobile network device position of the mobile network device at a first time; determining a second mobile network device position of the mobile network device at a second time; calculating a first relative velocity between the mobile network device and a first foreign agent; calculating a second relative velocity between the mobile network device and a second foreign agent; comparing the first relative velocity and the second relative velocity to determine whether the mobile network device is approaching the first foreign agent or the second foreign agent more rapidly; and selecting either the first foreign agent or the second foreign agent according to the determining step.

The computer program may control the mobile network device to determine whether the mobile network device is closer to the first foreign agent or to the second foreign agent.

Some aspects of the invention provide a method of selecting a foreign agent that includes the following steps: receiving a first coordinate signal indicating a first position of a first foreign agent at a first time; receiving a second coordinate signal indicating a second position of the first foreign agent at a second time; receiving a third coordinate signal indicating a third position of a second foreign agent at a third time; receiving a fourth coordinate signal indicating a fourth position of the second foreign agent at a fourth time; determining first, second, third and fourth mobile network device positions of a mobile network device at approximately the first, second, third and fourth times; calculating a first relative velocity between the mobile network device and the first foreign agent using the first coordinate signal and the second coordinate signal and the first and second mobile network device positions; calculating a second relative velocity between the mobile network device and the second foreign agent using the third coordinate signal and fourth coordinate signal and the third and fourth mobile network device positions; comparing the first relative velocity and the second relative velocity to determine whether the mobile network device is approaching the first foreign agent or the second foreign agent more rapidly; and selecting either the first foreign agent or the second foreign agent according to the determination of the comparing step.

Other embodiments of the invention provide a computer program embodied in a machine-readable medium, the computer program controlling a mobile network device to perform the following steps: receiving a first coordinate signal indicating a first position of a first foreign agent at a first time; receiving a second coordinate signal indicating a second position of the first foreign agent at a second time; receiving a third coordinate signal indicating a third position of a second foreign agent at a third time; receiving a fourth coordinate signal indicating a fourth position of the second foreign agent at a fourth time; determining first, second, third and fourth mobile network device positions of the mobile network device at approximately the first, second, third and fourth times; calculating a first relative velocity between the mobile network device and the first foreign agent; calculating a second relative velocity between the mobile network device and the second foreign agent; comparing the first relative velocity and the second relative velocity to determine whether the mobile network device is approaching the first foreign agent or the second foreign agent more rapidly; and selecting either the first foreign agent or the second foreign agent according to the determination of the comparing step.

Some embodiments of the invention provide a mobile network device configured to perform the following steps: receiving a first coordinate signal indicating a first position of a first foreign agent at a first time; receiving a second coordinate signal indicating a second position of the first foreign agent at a second time; receiving a third coordinate signal indicating a third position of a second foreign agent at a third time; receiving a fourth coordinate signal indicating a fourth position of the second foreign agent at a fourth time; determining first, second, third and fourth mobile network device positions of a mobile network device at approximately the first, second, third and fourth times; calculating a first relative velocity between the mobile network device and the first foreign agent using the first and second coordinate signals and the first and second mobile network device positions; calculating a second relative velocity between the mobile network device and the second foreign agent using the third and fourth coordinate signals and the third and fourth mobile network device positions; comparing the first relative velocity and the second relative velocity to determine whether the mobile network device is approaching the first foreign agent or the second foreign agent more rapidly; and selecting either the first foreign agent or the second foreign agent according to the determination of the comparing step.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 2:
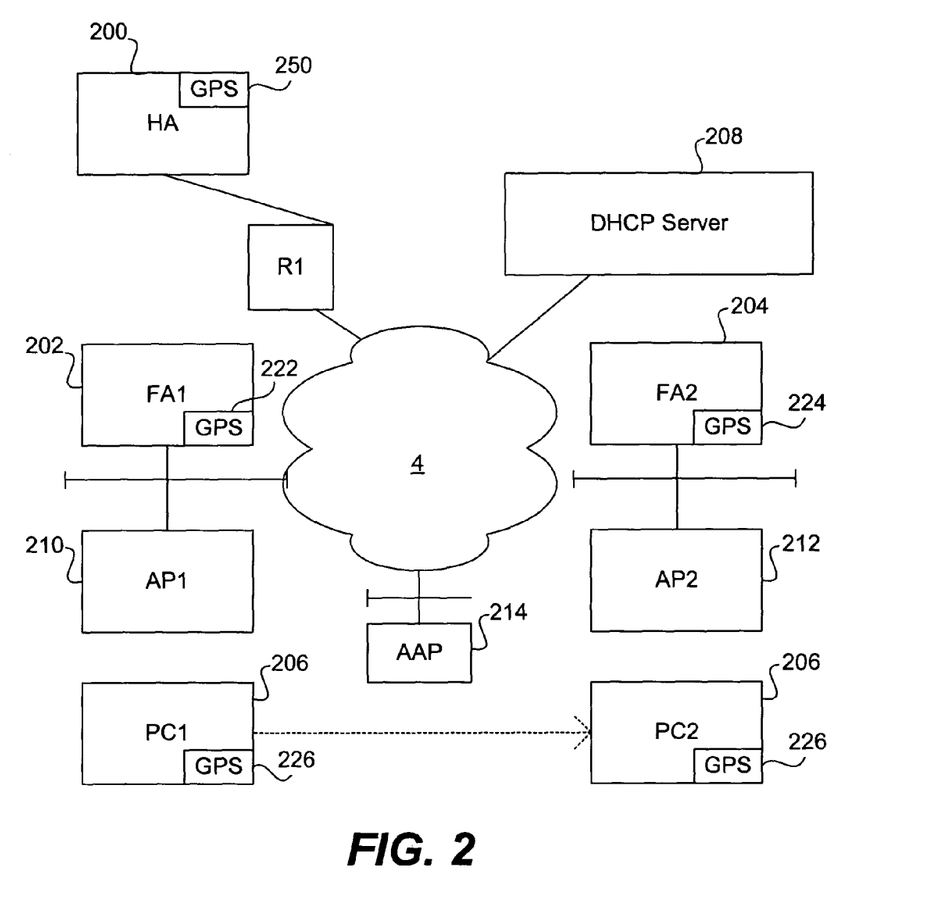
FIG. 2 is a diagram illustrating a system that may be used to implement the present invention.

FIG. 2 is a block diagram illustrating a system in which the present invention may be implemented. In the following description, the present invention is implemented in a wireless network. However, although the present invention is described as being implemented in a wireless network, the present invention may also be implemented in a non-wireless network.

In this embodiment, Foreign Agents 202 and 204 include GPS devices 222 and 224, respectively. For example, GPS device 222 or 224 may be a GPS receiver such as a Garmin Model GPS 76, a Magellan™ Map 330 GPS, a Magellan™ Meridian Platinum GPS, or a similar GPS device. In this embodiment, Foreign Agents 202 and 204 are stationary but in other embodiments Foreign Agents 202 and 204 are mobile and therefore support Mobile IP.

Node 206, which includes GPS device 226, can roam from its Home Agent 200 to a first Foreign Agent 202. In this embodiment, Home Agent 200 is equipped with GPS device 250. In some embodiments, GPS device 226 or 250 is a Garmin Model GPS 76, a Magellan™ Map 330 GPS, a Magellan™ Meridian Platinum GPS, or a similar GPS device. In preferred embodiments, GPS device 226 is a GPS receiver with differential GPS ("DGPS") capability or widearea augmentation system ("WAAS") capability, as discussed below. In some such embodiments, GPS device 226 cooperates with GPS device 250 and/or one of GPS devices 222 or 224 to calculate a position using DGPS.

In alternative embodiments, GPS device 226 cooperates with GPS device 250 and/or one of GPS devices 222 or 224 to receive an inverted DGPS calculation from Foreign Agent 202, Foreign Agent 204, Home Agent 200, or another device connected to network 4. In such embodiments, GPS device 226 need not be "differential ready" (able to calculate its location using a DGPS algorithm). Inverted DGPS will also be discussed below.

Once attached to the first Foreign Agent 202, the node 206 may again roam to second Foreign Agent 204 or another foreign agent. Although the node 206 may have an assigned IP address, when the node 206 roams, it is preferable for the node to maintain this assigned IP address. For instance, although a DHCP server 208 typically dynamically assigns a new IP address to a node when its location within a network has changed, it is preferable to maintain the IP address originally assigned to the node by the DHCP server 208.

In the following example, various embodiments are described with reference to a mobile node. As noted above, the descriptions herein regarding the movement of mobile nodes shall apply generally to the movement of mobile network devices, unless otherwise specified. For example, the following discussions may apply equally to a mobile node supporting Mobile IP or to a mobile router supporting Mobile IP. One method of implementing a mobile router is described in U.S. patent application Ser. No. 09/227,396, which is incorporated herein by reference for all purposes.

In a wireless network, Access Points 210 and 212 are coupled to the Foreign Agents 202 and 204. By way of example, in a wireless network, the Access Points 210 and 212 may have an antenna and receiver for receiving packets. As yet another example, the Access Points 210 and 212 may designate connection points in a non-wireless network. Typically, a node implementing Mobile IP registers and de-registers with its Home Agent through the registration process. However, according to the present invention, registration is initiated by the Access Point on behalf of the node. Similarly, de-registration may be initiated by the Access Point on behalf of the roaming node.

For instance, node 206 that has roamed to the first Foreign Agent 202 is registered with the node's Home Agent 200 when the first Access Point 206 composes and sends a registration request packet via the first Foreign Agent 202. Thus, the first Foreign Agent's visitor table and the Home Agent's mobility binding table are updated to indicate that the node has roamed to the first Foreign Agent 202.

When the node 206 roams to the second Foreign Agent 204, the node 206 is de-registered (e.g., by one of the Access Points 210, 212, either of the Foreign Agents 202, 204 or the Home Agent 200). In other words, the first Foreign Agent 202 updates its visitor table to reflect the movement of the node 206. Similarly, the Home Agent's mobility binding table is updated to reflect the movement of the node 206 to the second Foreign Agent 204. Thus, the appropriate entry in the first Foreign Agent's visitor table and the Home Agent's mobility binding table may be deleted. A new entry is then entered in the Home Agent's mobility binding table and the second Foreign Agent's visitor table upon completion of registration of the mobile node with the Home Agent. Alternatively, the visitor table may be maintained and updated by the Access Point.

Figure 3:
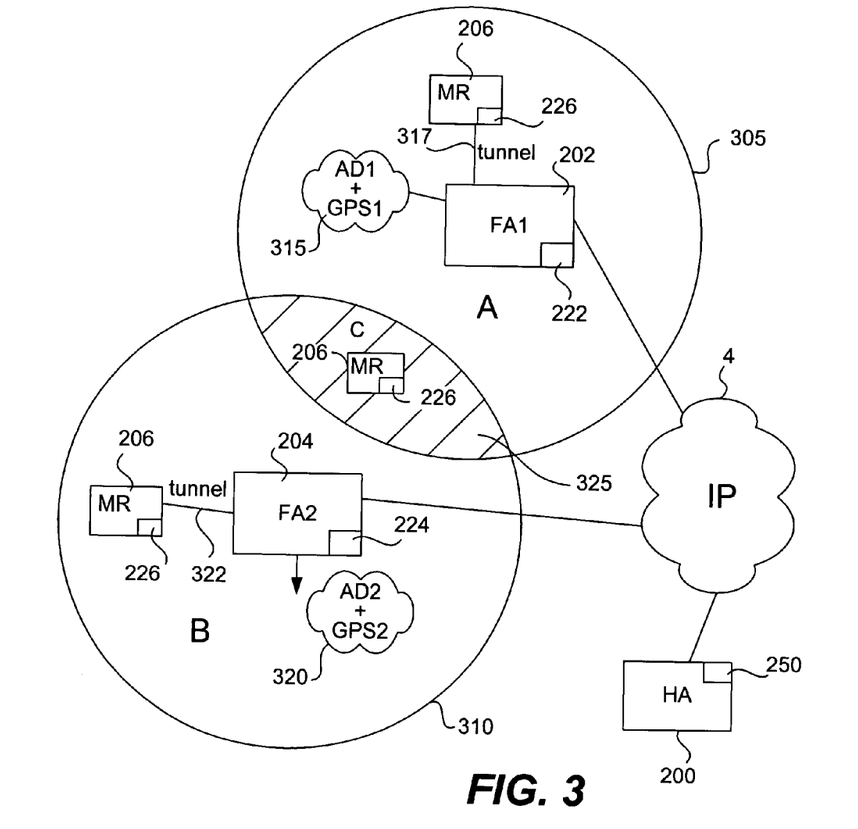
FIG. 3 illustrates a mobile node in a variety of positions with respect to two foreign agents' coverage areas.

In FIG. 3, node 206 is shown in three different positions. In position A, node 206 (which is a mobile router in this example) is within range 305 of Foreign Agent 202, but is not within range 310 of Foreign Agent 204. In this example, both of Foreign Agents 202 and 204 are using the same protocol and ranges 305 and 310 are approximately the same. For example, Foreign Agents 202 and 204 could each be using an IEEE 802.11 protocol, a General Packet Radio Service ("GPRS") protocol or a Cellular Digital Packet Data ("CDPD") protocol. Here, Foreign Agents 202 and 204 are using an IEEE 802.11 protocol.

Accordingly, when node 206 is in position A, node 206 receives advertisement packet 315 from Foreign Agent 202, but does not receive advertisement packet 320 from Foreign Agent 204. Therefore, node 206 establishes tunnel 317 with Foreign Agent 202. Similarly, when node 206 is in position B, node 206 receives advertisement packet 320 from Foreign Agent 204, but does not receive advertisement packet 315 from Foreign Agent 202. Therefore, node 206 establishes tunnel 322 with Foreign Agent 204.

However, when node 206 is in position C, node 206 receives advertisement packet 315 from Foreign Agent 202 and also receives advertisement packet 320 from Foreign Agent 204. Therefore, unless the methods of the present invention were applied, node 206 would continue to establish a tunnel with one of the foreign agents, receive an advertisement from the other, then tear down the tunnel established with the previous foreign agent, form a tunnel with the current foreign agent, etc.

In order to resolve this problem, advertisement packets 315 and 320 include position information (represented in FIG. 3 as coordinate signals GPS1 and GPS2) that indicate the location of Foreign Agents 202 and 204, respectively. Such information may be included, for example, in a field of an advertisement packet sent by Foreign Agents 202 and 204.

In preferred embodiments, advertisements sent by Foreign Agents 202 and 204 have the following structure: an internet protocol ("IP") header, as defined in RFC 791; an internet control message protocol ("ICMP") router advertisement, as defined in RFC 1256; a mobility agent advertisement extension, as defined in RFC 2002, section 2.1.1; and (optionally) a prefix-length extension, as defined in RFC 2002, section 2.1.2. RFCs 791, 1256 and 2002 are hereby incorporated by reference for all purposes.

Figure 3A:
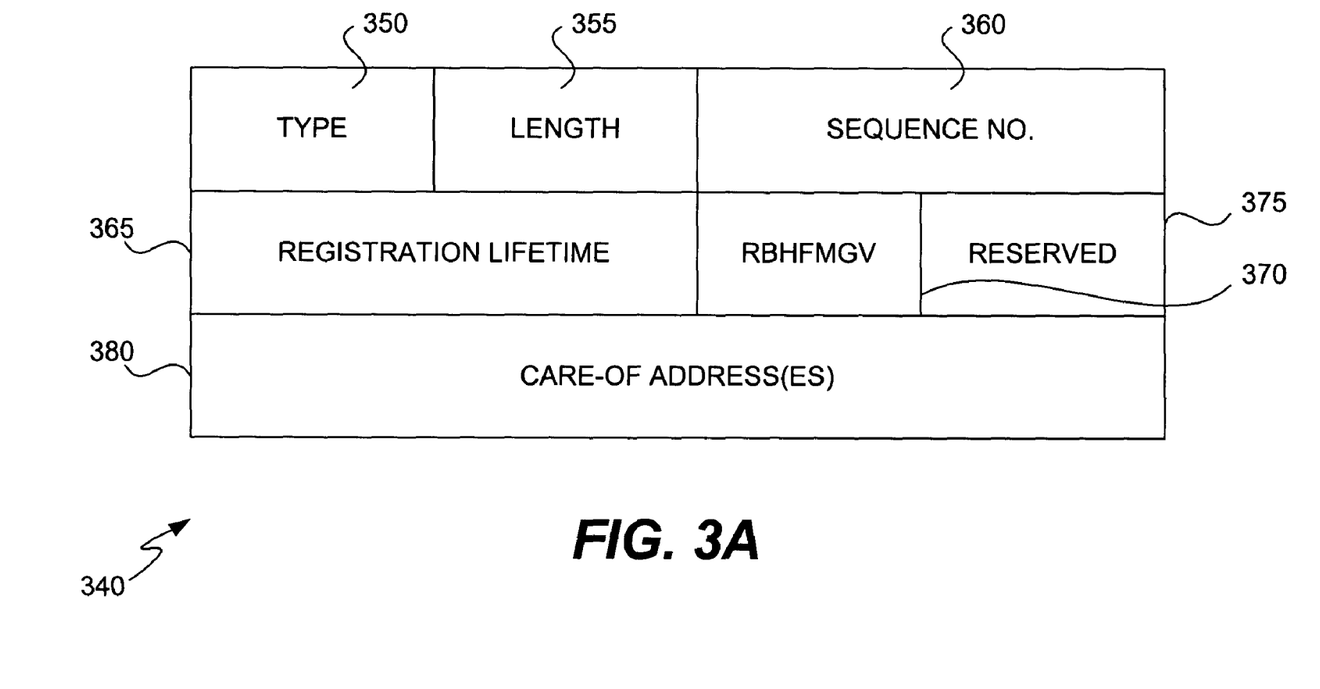
FIG. 3A illustrates one possible format of a mobility agent advertisement extension which could include position information.

FIG. 3A illustrates one example of mobility agent advertisement extension 340 which can include position information according to some aspects of the invention. Type field 350 and length field indicate the type and length, respectively, of mobility agent advertisement extension 340. Sequence number field 360 indicates the number of agent advertisements sent since the agent was initialized. Registration lifetime field 365 indicates the longest time that this agent is willing to accept in any registration request.

Field 370 is divided into sub-fields R, B, H, F, M, G and V. Field R indicates whether registration is required with this foreign agent (or another foreign agent on this link) is required, instead of using a co-located "care-of" address. Sub-field B indicates whether the foreign agent is busy. Sub-field H indicates whether the foreign agent may serve as a home agent on the link on which this agent advertisement is sent. Sub-field F indicates that this foreign agent serves as a foreign agent on the link on which this agent advertisement is sent. Sub-field M states whether this agent receives tunneled datagrams that use minimal encapsulation. Sub-field G states whether this agent can receive tunneled datagrams that use GRE encapsulation. Sub-field V indicates whether this foreign agent supports use of Van Jacobson header compression with a registered mobile node.

Reserved field 375 may be defined by a user or customer. Accordingly, in some aspects of the invention, reserved field 375 is used to indicate position information, e.g., the location of the foreign agent. In other aspects of the invention, position information is located in a separate extension field.

Field 380 indicates the "care-of" address(es) provided by the foreign agent. Some such packets also include a padding extension, as defined in RFC 2002, section 2.1.3.

According to some aspects of the invention, node 206 uses position information to select a foreign agent. Two general methods according to some aspects of the invention are illustrated in the flow charts of FIGS. 4 and 5. The steps shown in FIGS. 4 and 5 need not be performed in the order indicated. For example, the order of receiving information and calculating distance (or velocity) need not be performed in the order indicated. The following discussion uses the term "old foreign agent" to mean the foreign agent with which node 206 has established a connection. For example, if node 206 had already established a connection with Foreign Agent 202, that would be the "old" foreign agent. If node 206 then received an advertisement from Foreign Agent 204, that would be the "new" foreign agent.

Figure 4:
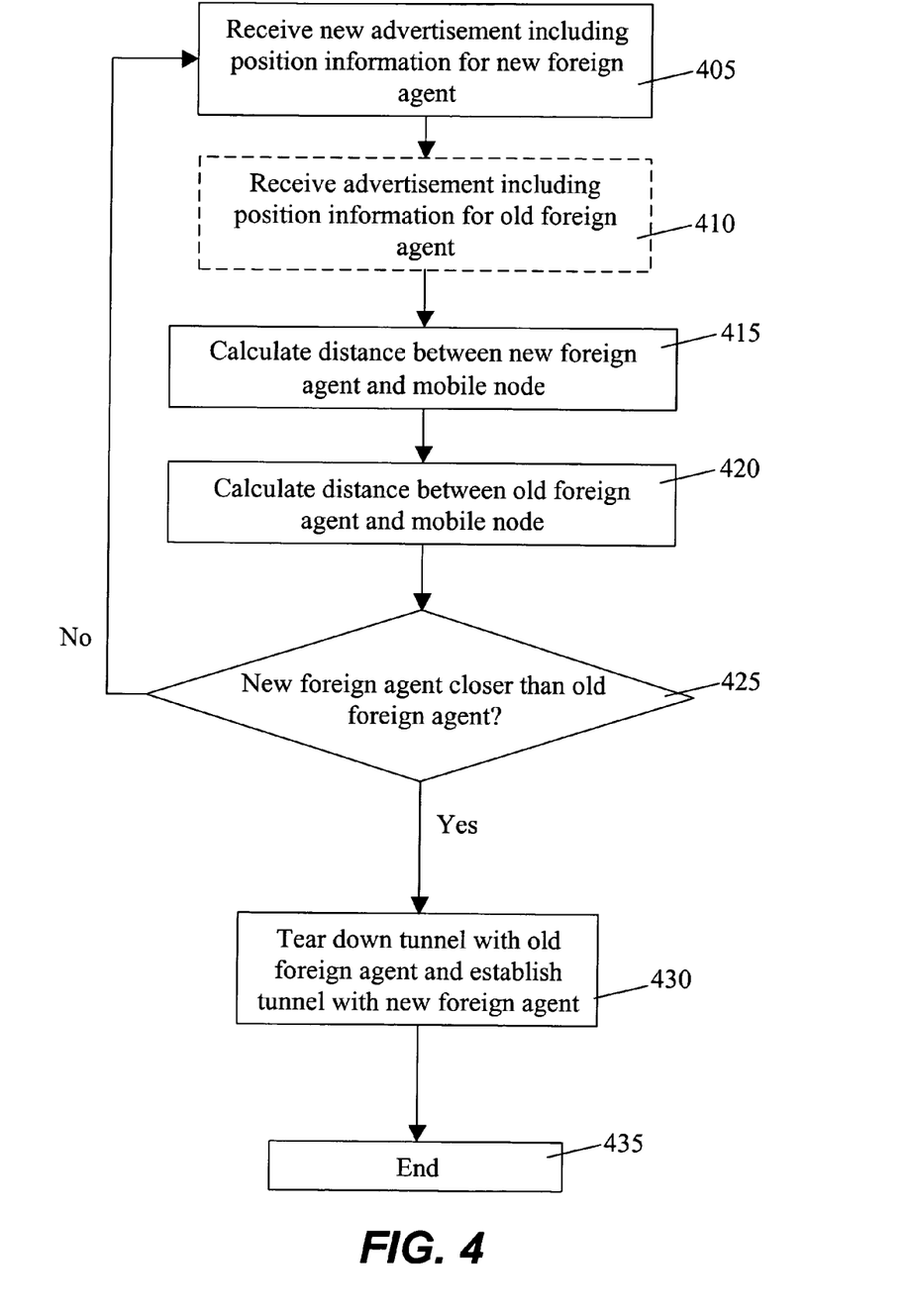
FIG. 4 is a flow chart that illustrates a method according to some aspects of the present invention.

In step 405, node 206 receives a new advertisement, including position information, from a new foreign agent. If the old foreign agent is stationary, node 206 will not need to re-calculate the position of the old foreign agent. However, the old foreign agent may not be stationary, or node 206 may not know whether the old foreign agent is stationary. Accordingly, in optional step 410, node 206 receives an advertisement, including position information, from the old foreign agent.

In step 415, node 206 calculates the distance between itself and the new foreign agent. In step 420, node 206 calculates the distance between itself and the old foreign agent. In step 425, node 206 determines whether the new foreign agent is closer than the old foreign agent. If so, node 206 tears down the connection with the old foreign agent and establishes a connection with the new foreign agent in step 430. If not, the process reverts to step 405. In some aspects of the invention, there is a predetermined time delay prior to evaluating another advertisement from a new foreign agent. The process ends in step 435.

Figure 5:
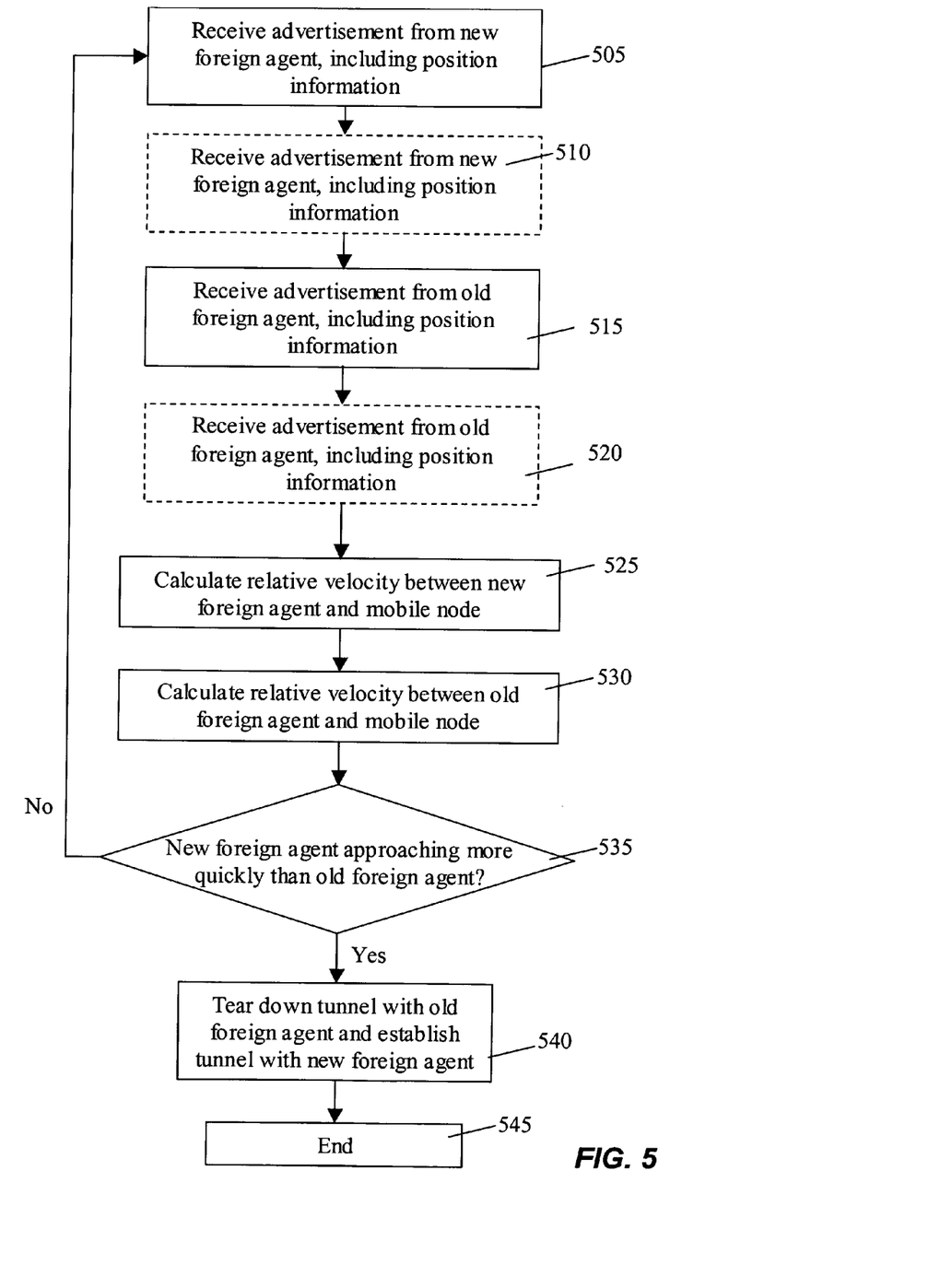
FIG. 5 is a flow chart that illustrates a method according to other aspects of the present invention.

According to other aspects of the invention, node 206 selects a foreign agent according to the apparent or relative velocity between the foreign agent and node 206. In some such aspects of the invention, node 206 determines which foreign agent appears to be approaching most rapidly, as viewed from the reference frame of node 206, and selects that foreign agent. This apparent velocity could result from the movement of node 206 and/or the foreign agent(s).

These aspects of the invention are outlined in the flow chart of FIG. 5. In step 505, node 206 receives an advertisement from a new foreign agent at a first time, including position information. In optional step 510, node 206 receives a second advertisement, including position information, from the new foreign agent at a second time. Optional step 510 is needed if the new foreign agent is moving, or if node 206 does not know whether the new foreign agent is moving.

In step 515, node 206 receives an advertisement from the old foreign agent, including position information, at a third time. As noted above, the steps of FIG. 5 may not occur in the order shown. For example, the "third time" may occur prior to the first or second times. In optional step 520, node 206 receives a second advertisement, including position information, from the old foreign agent at a fourth time. Like step 510, optional step 520 is needed if the old foreign agent is moving, or if node 206 does not know whether the old foreign agent is moving.

In step 525, the relative velocity between the new foreign agent and node 206 is calculated. In step 530, the relative velocity between the old foreign agent and node 206 is calculated. In step 535, the relative velocities are compared and it is determined which foreign agent appears to be approaching node 206 more rapidly, based on the reference frame of node 206. It will be apparent to one of skill in the art that any other convenient reference frame may be used. According to preferred aspects of the invention, these calculations, comparisons and determinations are performed by node 206. However, according to other aspects of the invention, these functions are performed by another device, such as a foreign agent, a home agent or a corresponding node.

If the new foreign agent appears to be approaching node 206 more rapidly, the connection with the old foreign agent is torn down and a new connection is established with the new foreign agent in step 540. If not, the connection with the old foreign agent is left intact, at least for a predetermined time. The process ends in step 545.

In the above-described embodiments, once a foreign agent is selected, a registration request is sent to a Home Agent associated with the node via the selected foreign agent. The Home Agent processes the registration request, and sends a registration reply to the selected foreign agent. The selected foreign agent then forwards the registration reply to the node. In this manner, a node may select an optimal foreign agent via which to register with its Home Agent. Accordingly, since the optimal foreign agent is selected, the registration process is implemented in the most efficient manner.

According to preferred aspects of the present invention, the positions of the old and new foreign agents are determined by the Global Positioning System ("GPS"), which is a worldwide radio-navigation system formed from 24 GPS satellites and their ground stations. The ground stations monitor the GPS satellites and check both their status and their exact positions in space. A master ground station transmits corrections for the satellites' "ephemeris" (slight positional error) constants and clock offsets back to the satellites themselves. The satellites can then incorporate these updates in the signals they send to GPS receivers. The system was put in place by the U.S. Department of Defense, but aspects of the system are now widely used for non-military purposes.

The basis of GPS is "triangulation" from satellites, based on the travel time of radio signals. Measuring the time for a signal sent from the satellite to arrive at a GPS receiver allows a GPS device to calculate the distance to the satellite: a GPS signal is a radio signal, therefore the velocity is the speed of light. Therefore, the GPS system requires very accurate measurement of travel time. Along with distance, one needs to know the precise positions of GPS satellites. Finally, one must correct for any delays that signals from the GPS satellites experience as the signals travel through the Earth's atmosphere.

Suppose we measure our distance from a first satellite and find it to be X miles. This information narrows down all the possible locations we could be to the surface of a first sphere that is centered on the first satellite and has a radius of X miles. Then, suppose we determine that a second satellite is Y miles away. That tells us that our location is on the first sphere and also on a second sphere that is Y miles from the second satellite. In other words, the location is somewhere on the circle where the first and second spheres intersect.

If we then determine that we are Z miles from a third satellite, that means our position is one of the two points where the third sphere intersects the circle forming the intersection of the first two spheres. Therefore, by determining the distance to three satellites we can narrow our position to just two points in space. To determine which point is our actual location we could make a fourth measurement. However, generally one of the two points has an implausible position or velocity and can be rejected.

For a GPS receiver to use satellites as references for distance measurements, it must know the satellites' precise locations. This precise knowledge is made possible by a few important factors. First of all, GPS satellites have high and very predictable orbits. Minor variations in the orbits of GPS satellites are measured by the Department of Defense. This error information is sent to the GPS satellites and is transmitted along with the timing signals. Therefore, when a GPS receiver receives a timing signal from a GPS satellite, the GPS receiver also receives the most recent corrections to the satellite's position information.

GPS satellite transmissions are in the form of a pseudo-random code ("PRC"), which is a digital signal that is so complicated that it almost looks like random electrical noise. The complex pattern of the PRC helps ensure that a GPS receiver does not confuse a GPS signal with another signal. Each satellite has a unique PRC, which also ensures that the GPS receiver will not accidentally pick up another satellite's signal. Therefore, all GPS satellites can use the same frequency without jamming each other. The PRC also provides the Department of Defense a way to control access to the system. Moreover, the PRC make it possible to use information theory to amplify the GPS signal: this is why GPS receivers do not require large satellite dishes to receive GPS signals.

Small errors in timing could introduce large errors in distance calculations for a GPS receiver. The timing of "universal time" signals transmitted by GPS satellites is very precise, because these satellites include atomic clocks. However, atomic clocks are far too expensive ($50,000 to $100,000) for use with GPS receivers. Therefore, a GPS receiver makes a fourth satellite measurement to synchronize the receiver's clocks with universal time.

If a receiver's clock were synchronized with universal time, then all of the calculated spheres (the satellite ranges) would intersect at a single point. However, if the receiver's clock were not synchronized with universal time, the fourth sphere would not intersect with the first three at a single point. Therefore, the GPS receiver calculates a single correction factor by which it can adjust all of its timing measurements that would cause them all to intersect at a single point. This correction factor synchronizes the GPS receiver's clock with universal time. Accordingly, a GPS receiver should have at least four channels in order to make the four measurements simultaneously.

Civilian users worldwide may use the Standard Positioning Service ("SPS") without charge or restrictions. Most GPS receivers are capable of receiving and using the SPS signal. However, the accuracy of SPS signals is intentionally degraded by the Department of Defense. SPS has predictable accuracies of 100 meters for horizontal accuracy, 156 meters for vertical accuracy and 340 nanoseconds for time accuracy.

Authorized users with cryptographic equipment, keys and specially equipped GPS receivers can use the Precise Positioning System ("PPS"). U.S. military personnel, certain U.S. Government agencies and selected other users approved by the U.S. Government may use the PPS. The PPS has the following predictable accuracies: 22 meters horizontal accuracy; about 28 meters vertical accuracy; and 200 nanoseconds of time accuracy.

Differential GPS ("DGPS") allows the calculation of differential positions with accuracies in the range of 1 to 10 meters, even based on SPS signals. DGPS requires the use of at least two receivers, one of which is stationary and another of which moves. The stationary receiver is in a position that has been very accurately surveyed. The stationary receiver receives the same GPS signals as the moving receiver but instead of using timing signals to calculate its position, it uses its position to calculate timing. The stationary receiver calculates what the travel time of the GPS signals should be and compares the calculated times with the actual times to determine error correction factors.

The stationary receiver then transmits this error information to the moving receiver(s). The stationary receiver generally does not know which of the many available satellites a moving receiver is using to calculate its position, so the stationary receiver computes error correction factors for all the visible satellites and sends the error correction factors to the moving receivers. The moving receivers receive the list of error correction factors and apply the time corrections for the particular satellites they are using.

An alternative way of obtaining such error corrections is to obtain them from a third party. Some public agencies (for example, the United States Coast Guard) transmit such corrections. More and more reference stations are being established, especially near popular harbors and waterways. These stations often transmit on the radio beacons that are already in place for radio direction finding (usually in the 300 kHz range). Anyone in the area can receive these corrections and can dramatically improve the accuracy of their GPS measurements. Accordingly, many GPS receivers are now being designed to accept corrections, and some are even equipped with built-in radio receivers. Some corrections are distributed on the Internet.

"Inverted DGPS" provides some of the benefits of DGPS without requiring each GPS receiver to be "differential ready." Non-corrected GPS positions are transmitted from each moving GPS receiver to a "tracking office," which includes a computing device for applying the error correction factors (from a stationary receiver, a third party, etc.) to the received positions. Such a tracking office could be any device connected to IP network 4 of FIGS. 1-3, for example. If a tracking office is used to implement inverted DGPS, the tracking office could also calculate the distances and/or relative velocities between, e.g., node 206 and foreign agents.

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Access Points of this invention may be implemented in specially configured routers or servers, as well as Cisco Aironet 350 Series Access Points, available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 6:
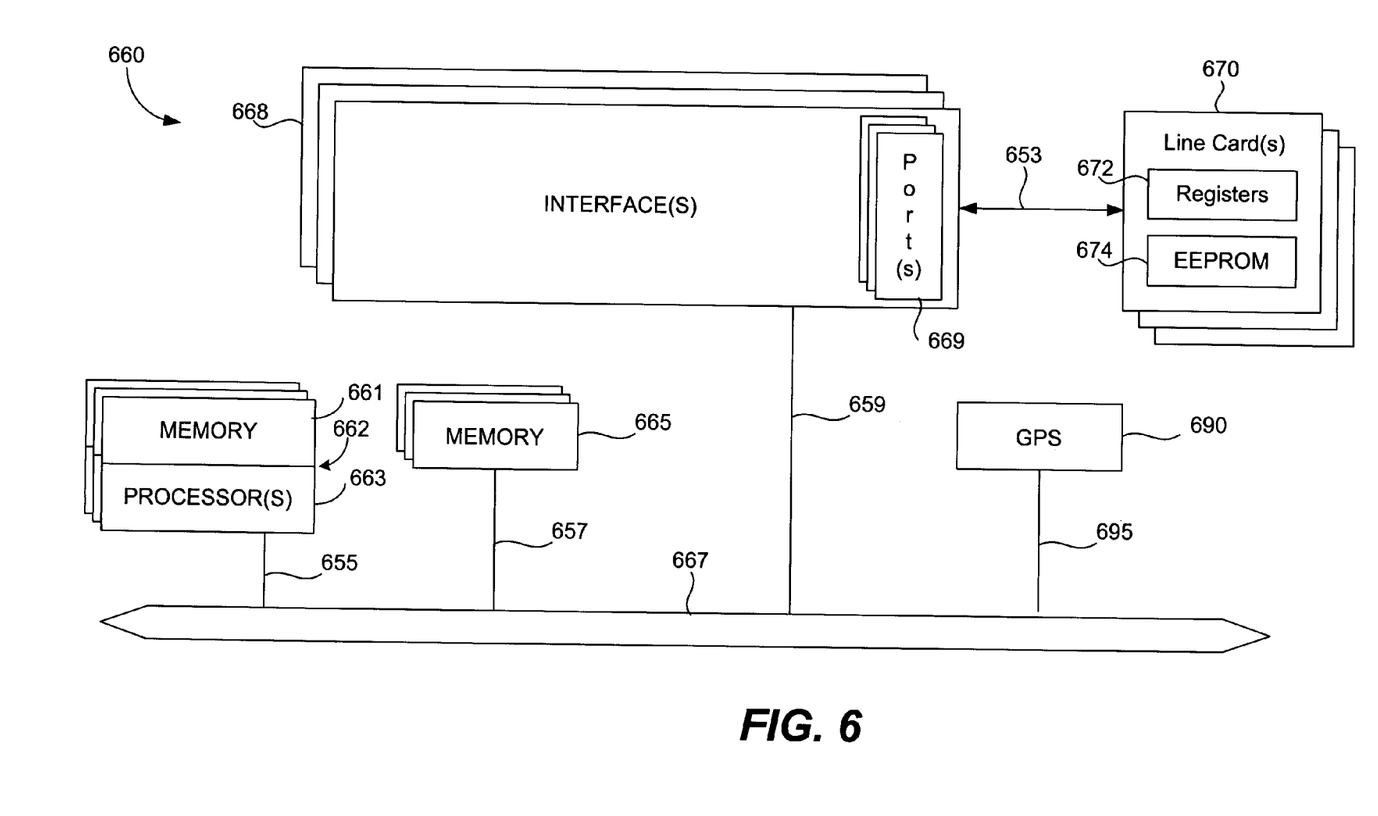
FIG. 6 is a block diagram of a network device that may be configured to implement aspects of the present invention.

Referring now to FIG. 6, a network device 660 suitable for implementing the techniques of the present invention will be described. Network device 660, which is in various embodiments a mobile node or mobile router 206, includes a master central processing unit (CPU) 662, interfaces 668, GPS device 690 and bus 667 (e.g., a PCI bus). In addition, the network device may also be used to implement an Access Point, as well as a Foreign Agent in accordance with various embodiments of the invention. When acting under the control of appropriate software or firmware, the CPU 662 may be responsible for implementing specific functions associated with the functions of a desired network device. For example, CPU 662 may be responsible for computing locations of Network Device 660 and foreign agents, computing relative velocities between Network Device 660 and foreign agents, analyzing packets, encapsulating packets, and forwarding packets for transmission to a network. The CPU 662 preferably accomplishes all these functions under the control of software including an operating system (e.g. Windows NT), and any appropriate applications software.

CPU 662 may include one or more processors 663, such as a processor from the Motorola family of microprocessors or the MIPS family of microprocessors. In an alternative embodiment, processor 663 is specially designed hardware for controlling the operations of network device 660. In a specific embodiment, a memory 661 (such as non-volatile RAM and/or ROM) also forms part of CPU 662. However, there are many different ways in which memory could be coupled to the system. Memory block 661 may be used for a variety of purposes such as, for example, caching and/or storing data, programming instructions, etc.

The interfaces 668 are typically provided as interface cards (sometimes referred to as "line cards"). Generally, they control the sending and receiving of data packets over the network and sometimes support other peripherals used with the network device 660. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications-intensive tasks, these interfaces allow the master microprocessor 662 to efficiently perform routing computations, network diagnostics, security functions, etc.

Although not shown, various removable antennas may be used for further increase range and reliability of the access points. In addition, radio transmit power e.g., 1, 5, 20, 30, 50, and 100 mW) on the Cisco Aironet 350. Series is configurable to meet coverage requirements and minimize interference. In addition, a Cisco Aironet AP can be configured as a redundant hot standby to another AP in the same coverage area. The hot-standby AP continually monitors the primary AP on the same channel, and assumes its role in the rare case of a failure of the primary AP.

Although the system shown in FIG. 6 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 665) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described access points, other entities used to tunnel packets to mobile nodes on remote network segments can be used as well. Moreover, the present invention may be applicable in a network supported by various protocols such as DHCP.

Accordingly, the present embodiments are to be considered as illustrative and not restrictive, and the invention is not to be limited to the details given herein, but may be modified within the scope and equivalents of the appended claims.

I claim:

1. A method of selecting a foreign agent, comprising:
receiving a first coordinate signal indicating a first foreign agent position, wherein the first coordinate signal is part of a first agent advertisement packet transmitted by the first foreign agent;
receiving a second coordinate signal indicating a second foreign agent position, wherein the second coordinate signal is part of a second agent advertisement packet transmitted by the second foreign agent;
determining a first mobile network device position of a mobile network device at a first time;
determining a second mobile network device position of the mobile network device at a second time;
calculating a first relative velocity between the mobile network device and a first foreign agent;
calculating a second relative velocity between the mobile network device and a second foreign agent position;
comparing the first relative velocity and the second relative velocity to determine whether the mobile network device is approaching the first foreign agent or the second foreign agent more rapidly; and
selecting either the first foreign agent or the second foreign agent according to the determination of the comparing step.

2. The method as recited in claim 1, wherein the mobile network device is a mobile router.

3. The method of claim 1, further comprising the step of determining whether the mobile network device is closer to the first foreign agent or to the second foreign agent.

4. The method of claim 1, wherein the calculating, comparing and selecting steps are performed by the mobile network device.

5. The method of claim 1, wherein the first coordinate signal comprises global positioning system data.

6. The method of claim 1, wherein the second coordinate signal comprises global positioning system data.

7. A mobile network device, comprising:
means for receiving a first coordinate signal indicating a first foreign agent position from the first foreign agent wherein the first coordinate signal is part of a first agent advertisement packet transmitted by the first foreign agent;
means for receiving a second coordinate signal indicating a second foreign agent position from the second foreign agent, wherein the second coordinate signal is part of a second agent advertisement packet transmitted by the second foreign agent;
means for determining a first mobile network device position of the mobile network device at a first time;
means for determining a second mobile network device position of the mobile network device at a second time;
means for calculating a first relative velocity between the mobile network device and a first foreign agent;
means for calculating a second relative velocity between the mobile network device and a second foreign agent;
means for comparing the first relative velocity and the second relative velocity to determine whether the mobile network device is approaching the first foreign agent or the second foreign agent more rapidly; and
means for selecting either the first foreign agent or the second foreign agent according to the determination of the comparing step.

8. The mobile network device of claim 7, further comprising means for determining whether the mobile network device is closer to the first foreign agent or to the second foreign agent.

9. A mobile network device configured to perform the following steps:
receiving a first coordinate signal indicating a first foreign agent position from the first foreign agent, wherein the first coordinate signal is part of a first agent advertisement packet transmitted by the first foreign agent;
receiving a second coordinate signal indicating a second foreign agent position from the second foreign agent, wherein the second coordinate signal is part of a second agent advertisement packet transmitted by the second foreign agent;
determining a first mobile network device position of the mobile network device at a first time;
determining a second mobile network device position of the mobile network device at a second time;
calculating a first relative velocity between the mobile network device and a first foreign agent;
calculating a second relative velocity between the mobile network device and a second foreign agent;
comparing the first relative velocity and the second relative velocity to determine whether the mobile network device is approaching the first foreign agent or the second foreign agent more rapidly; and
selecting either the first foreign agent or the second foreign agent according to the determination of the comparing step.

10. The mobile network device as recited in claim 9, further configured for:
  sending a registration request to a Home Agent via the selected foreign agent.

11. The mobile network device of claim 9, wherein the first coordinate signal comprises global positioning system data.

12. The mobile network device of claim 9, wherein the second coordinate signal comprises global positioning system data.

13. The mobile network device as recited in claim 9, wherein the mobile network device comprises a mobile router.

14. The mobile network device of claim 9, further configured to determine whether the mobile network device is closer to the first foreign agent or to the second foreign agent.

15. A computer program embodied in a machine-readable medium, the computer program controlling a mobile network device to perform the following steps:
  receiving a first coordinate signal indicating a first foreign agent position from the first foreign agent, wherein the first coordinate signal is part of a first agent advertisement packet transmitted by the first foreign agent;
  receiving a second coordinate signal indicating a second foreign agent position from the second foreign agent, wherein the second coordinate signal is part of a second agent advertisement packet transmitted by the second foreign agent;
  determining a first mobile network device position of the mobile network device at a first time;
  determining a second mobile network device position of the mobile network device at a second time;
  calculating a first relative velocity between the mobile network device and a first foreign agent;
  calculating a second relative velocity between the mobile network device and a second foreign agent;
  comparing the first relative velocity and the second relative velocity to determine whether the mobile network device is approaching the first foreign agent or the second foreign agent more rapidly; and
  selecting either the first foreign agent or the second foreign agent according to the determination of the comparing step.

16. The computer program of claim 15, wherein the first coordinate signal comprises global positioning system data.

17. The computer program of claim 15, wherein the second coordinate signal comprises global positioning system data.

18. The computer program of claim 15, wherein the computer program further controls the mobile network device to determine whether the mobile network device is closer to the first foreign agent or to the second foreign agent.

19. A method of selecting a foreign agent, comprising:
  receiving a first coordinate signal indicating a first position of a first foreign agent from the first foreign agent at a first time, wherein the first coordinate signal is part of a first agent advertisement packet transmitted by the first foreign agent;
  receiving a second coordinate signal indicating a second position of the first foreign agent from the first foreign agent at a second time, wherein the second coordinate signal is part of a second agent advertisement packet transmitted by the first foreign agent;
  receiving a third coordinate signal indicating a third position of a second foreign agent from the second foreign agent at a third time, wherein the third coordinate signal is part of a third agent advertisement packet transmitted by the second foreign agent;
  receiving a fourth coordinate signal indicating a fourth position of the second foreign agent from the second foreign agent at a fourth time, wherein the fourth coordinate signal is part of a fourth agent advertisement packet transmitted by the second foreign agent;
  determining first, second, third and fourth mobile network device positions of a mobile network device at approximately the first, second, third and fourth times;
  calculating a first relative velocity between the mobile network device and the first foreign agent using the first coordinate signal and the second coordinate signal and the first and second mobile network device positions;
  calculating a second relative velocity between the mobile network device and the second foreign agent using the third coordinate signal and fourth coordinate signal and the third and fourth mobile network device positions;
  comparing the first relative velocity and the second relative velocity to determine whether the mobile network device is approaching the first foreign agent or the second foreign agent more rapidly; and
  selecting either the first foreign agent or the second foreign agent according to the determination of the comparing step.

20. A computer program embodied in a machine-readable medium, the computer program controlling a mobile network device to perform the following steps:
  receiving a first coordinate signal indicating a first position of a first foreign agent at a first time, wherein the first coordinate signal is part of a first agent advertisement packet transmitted by the first foreign agent;
  receiving a second coordinate signal indicating a second position of the first foreign agent at a second time, wherein the second coordinate signal is part of a second agent advertisement packet transmitted by the first foreign agent;
  receiving a third coordinate signal indicating a third position of a second foreign agent at a third time, wherein the third coordinate signal is part of a third agent advertisement packet transmitted by the second foreign agent;
  receiving a fourth coordinate signal indicating a fourth position of the second foreign agent at a fourth time, wherein the fourth coordinate signal is part of a fourth agent advertisement packet transmitted by the second foreign agent;
  determining first, second, third and fourth mobile network device positions of the mobile network device at approximately the first, second, third and fourth times;
  calculating a first relative velocity between the mobile network device and the first foreign agent;
  calculating a second relative velocity between the mobile network device and the second foreign agent;
  comparing the first relative velocity and the second relative velocity to determine whether the mobile network device is approaching the first foreign agent or the second foreign agent more rapidly; and
  selecting either the first foreign agent or the second foreign agent according to the determination of the comparing step.

21. A mobile network device configured to perform the following steps:
  receiving a first coordinate signal indicating a first position of a first foreign agent from the first foreign agent at a first time, wherein the first coordinate signal is part of a first agent advertisement packet transmitted by the first foreign agent;
  receiving a second coordinate signal indicating a second position of the first foreign agent from the first foreign agent at a second time, wherein the second coordinate signal is part of a second agent advertisement packet transmitted by the first foreign agent;

receiving a third coordinate signal indicating a third position of a second foreign agent from the second foreign agent at a third time, wherein the third coordinate signal is part of a third agent advertisement packet transmitted by the second foreign agent;

receiving a fourth coordinate signal indicating a fourth position of the second foreign agent from the second foreign agent at a fourth time, wherein the fourth coordinate signal is part of a fourth agent advertisement packet transmitted by the second foreign agent;

determining first, second, third and fourth mobile network device positions of a mobile network device at approximately the first, second, third and fourth times;

calculating a first relative velocity between the mobile network device and the first foreign agent using the first and second coordinate signals and the first and second mobile network device positions;

calculating a second relative velocity between the mobile network device and the second foreign agent using the third and fourth coordinate signals and the third and fourth mobile network device positions;

comparing the first relative velocity and the second relative velocity to determine whether the mobile network device is approaching the first foreign agent or the second foreign agent more rapidly; and selecting either the first foreign agent or the second foreign agent according to the determination of the comparing step.

22. The mobile network device as recited in claim 21, wherein the mobile network device is a mobile router.

* * * * *